United States Patent [19]

Tateishi et al.

[11] 4,437,906
[45] Mar. 20, 1984

[54] FLUX COMPOSITION FOR ELECTRO-SLAG OVER-LAY WELDING OF A CYLINDRICAL VESSEL WITH A STRIP ELECTRODE

[75] Inventors: Junji Tateishi, Chiba; Takeharu Ishikawa, Ichihara; Shozaburo Nakano, Mobara; Noboru Nishiyama, Ichihara, all of Japan

[73] Assignee: Kawasaki Steel Corporation, Kobe, Japan

[21] Appl. No.: 475,362

[22] Filed: Mar. 14, 1983

[30] Foreign Application Priority Data

Mar. 26, 1982 [JP] Japan ................... 57-47302

[51] Int. Cl.³ ............................................. B23K 35/34
[52] U.S. Cl. ..................................................... 148/26
[58] Field of Search ................ 75/257, 53, 58; 148/26

[56] References Cited

U.S. PATENT DOCUMENTS

| | | | |
|---|---|---|---|
| 3,396,010 | 8/1968 | Gould | 75/53 |
| 3,627,592 | 12/1971 | Schmidt | 148/26 |
| 3,857,702 | 12/1974 | Corbett | 148/26 |
| 4,338,142 | 7/1982 | Okuda | 75/53 |

*Primary Examiner*—Peter D. Rosenberg
*Attorney, Agent, or Firm*—Balogh, Osann, Kramer, Dvorak, Genova & Traub

[57] ABSTRACT

A flux composition suitable for electro-slag over-lay welding a stainless steel on a circumferential inner surface of a cylindrical vessel with a strip electrode under controlling a flow of molten slag and metal with an outer electro-magnetic field, which contains 50–60% by weight of $CaF_2$, 10–20% by weight of $SiO_2$, 5–25% by weight of $CaO$ and 10–30% by weight of $Al_2O_3$ in a ratio of $SiO_2/CaF_2$ of at least 0.20 and a ratio of $CaO/SiO_2$ of at least 0.50.

2 Claims, 4 Drawing Figures

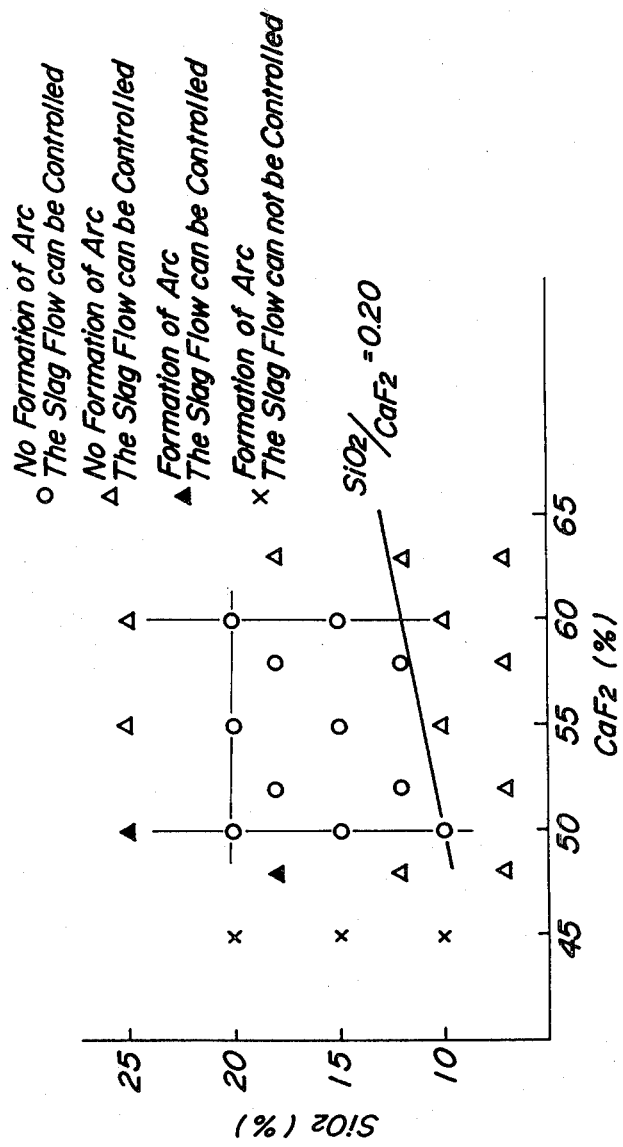

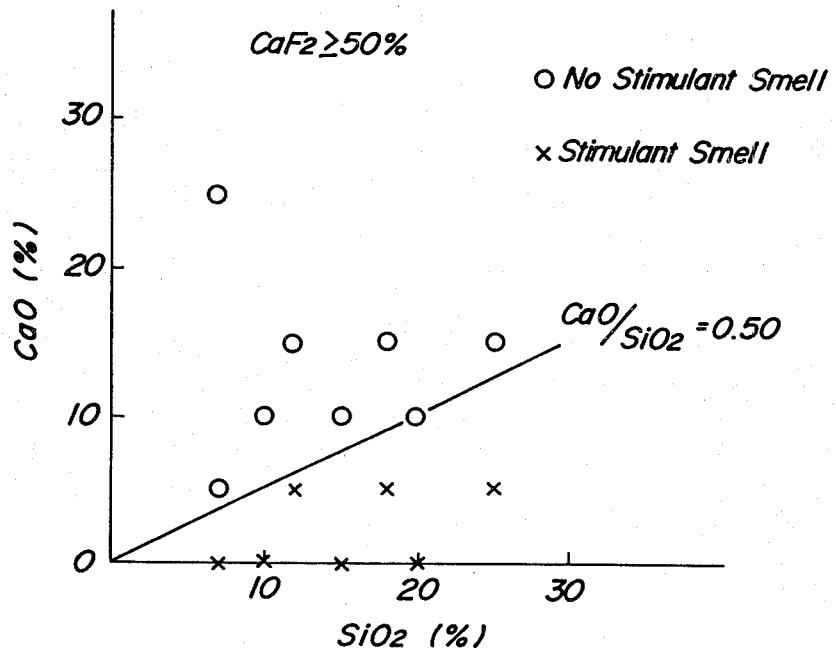
FIG_4

FLUX COMPOSITION FOR ELECTRO-SLAG OVER-LAY WELDING OF A CYLINDRICAL VESSEL WITH A STRIP ELECTRODE

BACKGROUND OF THE INVENTION

1. Field of the Invention

The present invention relates to a flux composition adaptable for controlling a slag flow in an electro-slag over-lay welding of a cylindrical vessel by using a strip electrode in down hand position particularly with an outer electro-magnetic field.

2. Description of the Prior Art

The inner surface of cylindrical vessels used for pressure vessels for atomic power generation and reactors for chemical plant is surfaced with a stainless steel and the like for providing corrosion resistance. The over-lay welding has been carried out by various processes but recently, the electro-slag over-lay welding with a strip electrode in down hand position in which the dilution by base metal is low, has generated great interest. This process includes flowing electric current through a molten slag from the strip electrode to generate Joule's heat and melting the electrode and the base metal due to this heat.

As the flux compositions applied thereto, a flux having a high content of $CaF_2$ as disclosed in Japanese Patent Publication No. 53(1978)-29,657 and Japanese Patent Laid-open Specification No. 55(1980)-165,294 and a flux having a high content of $TiO_2$ as disclosed in Japanese Patent Laid-open Specification No. 54(1979)-9,139 have been known.

The electro-slag over-lay welding process is an excellent one wherein the dilution by a base metal is low. However, when the process is applied for surfacing a cylindrical circumferential surface (particularly inner surface of the above described pressure vessel), the flowing state of the molten slag and metal varies at the edge portions and the central portion of the cylinder due to the means and place for connecting ground to the cylinder and to the influence of the magnetic field generated by a current supplying cable; or the molten metal flow varies in the vicinity of ground and the defects of under cutting and slag inclusion are apt to be caused. Particularly when a broad strip electrode is used for improving the surfacing efficiency, the electric current becomes large and therefore the above described tendency becomes noticeable and therefore, even if the conditions under which the good bead can be experimentally obtained by means of a broad electrode, are adopted as such, such conditions often cannot be applied as the satisfactory electro-slag over-lay welding process in practice.

Furthermore, these cylindrical bodies are made by bend-working a steel sheet, so that it is impossible in view of the working precision to obtain a true cylinder. When this distorted cylinder is subjected to the over-lay welding while being rotated on a turning roller, the position where a strip electrode for the electro-slag over-lay welding is set, influences or effects the welding, so that careful consideration should be given to the variation of the position.

Japanese Patent Laid-open Specification No. 55(1980)-136,566 (U.S. Pat. No. 4,309,587) has disclosed that an outer electro-magnetic field is applied to a welding current to generate Lorentz's force, whereby the flow of the molten slag is controlled as shown in FIG. 2. If the flow of the molten slag and metal is controlled with an outer electro-magnetic field as shown in the above U.S. Pat. no. 4,309,587, the variation of the flow due to the external factor is effectively restrained and the excellent surfaced bead having no under cutting nor slag inclusion can be easily obtained even by using a broad strip electrode.

SUMMARY OF THE INVENTION

An object of the present invention is to provide flux compositions suitable for magnetic stirring the molten slag and metal with an outer electro-magnetic field for preventing the formation of under cutting and slag inclusion when an inner surface of pressure vessels for nuclear power station and chemical plant is surfaced with a stainless steel in electro-slag over-lay welding with a strip electrode in down hand position. For attaining this object, the following matters are essential.

(1) In order to effect the stable electro-slag over-lay welding wherein the arc is scarcely formed, the electro-conductivity of the slag is high.

(2) The slag has the moderate viscosity (when the viscosity is too low, the control of the flow of the molten slag is difficult and when the viscosity is too high, the slag does not flow.)

(3) Harmful $SiF_4$ gas is not formed.

It has been found that the above described essential matter (1) can be attained by adding 50–60% by weight of $CaF_2$, the above described essential matter (2) can be attained by adding 10–20% by weight of $SiO_2$ in a ratio of $SiO_2/CaF_2$ of at least 0.20 and the above described essential matter (3) can be attained by adding CaO so that a ratio of $CaO/SiO_2$ is at least 0.5.

BRIEF DESCRIPTION OF THE DRAWINGS

FIG. 3 is a graph showing the fluency of the $SiO_2$ content relative to the $CaF_2$ content upon the welding behavior in the electro-slag over-lay welding; and FIG. 4 is a graph showing the influence of the CaO content upon prevention of the stimulant smell when welding.

DETAILED EXPLANATION OF THE INVENTION

The inventors have made studies with respect to the influence of the flux composition upon the control of the flow when the electro-slag over-lay welding process wherein the flow of the molten slag and metal is controlled with the outer electro-magnetic field, is applied to a cylinder along the circumferential surface thereof and the following knowledge has been obtained.

Firstly, it has been found that when the flux having a high content of $CaF_2$ and a low content of $SiO_2$ as described on Japanese Patent Publication No. 53(1978)-29,657 is used, the viscosity of the slag is low and it is difficult to control the flow of the molten slag and metal with the outer electro-magnetic field and the flux disclosed in Japanese Patent Laid-open Specification No. 55(1980)-165,294, is small in the amount of $CaF_2$, so that undesirable arc is apt to be caused in the over-lay welding of the inner surface of a cylinder through the electro-slag over-lay welding process and the range of the permissible welding condition is narrow and the viscosity is too high, so that the fluidity of the molten slag is low and the control of the flow with the outer electro-magnetic field becomes difficult.

That is, by using the fused flux having a composition of 52% by weight of $CaF_2$, 7% by weight of $SiO_2$, 33% by weight of $Al_2O_3$, 5% by weight of MnO and 3% by weight of $ZrO_2$, which is similar to the composition of Example 3 of Japanese Patent Publication No. 53(1978)-29,657 and the fused flux having a composition of 45% by weight of $CaF_2$, 15% by weight of $SiO_2$, 15% by weight of CaO, 20% by weight of $Al_2O_3$ and 5% by weight of $Cr_2O_3$, which is similar to the composition of Example in Japanese Patent Laid-Open Specification No. 55(1980)-165,294, a test of the electro-slag over-lay welding process was carried out on the inner surface of a cylinder having an inner diameter of 2 m under the following condition.

Figure 1:
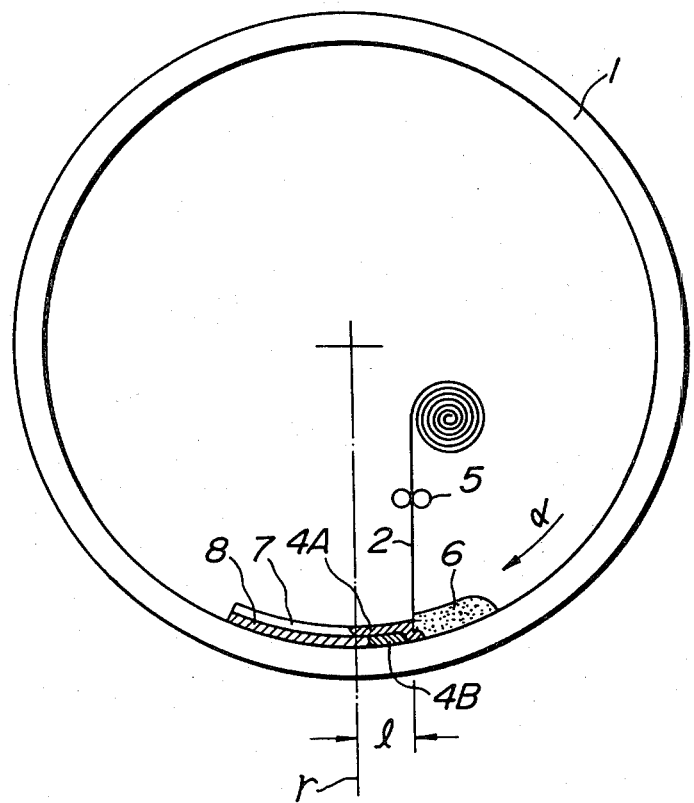
FIG. 1 is a cross-sectional view for illustrating an embodiment where electro-slag over-lay welding is carried out on a circumferential surface of a cylinder with a strip electrode.
Figure 2:
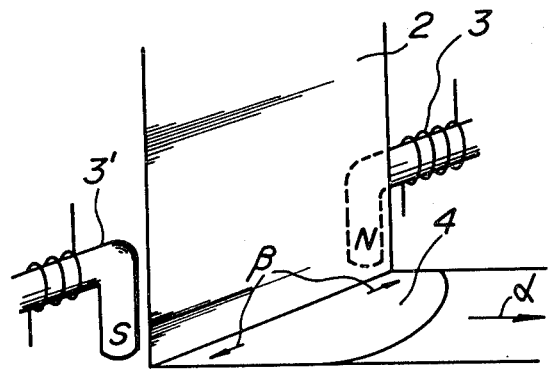
FIG. 2 is a perspective view for illustrating the manner for controlling the flow of the molten pool with an outer electro-magnetic field.

As shown in FIG. 1, a cylinder 1 was rotated as shown by an arrow $\alpha$ by using a strip electrode of SUS 309L having a width of 0.4×150 mm as a welding electrode under welding conditions of a current of 2,500 A, a voltage of 28 V and such a peripheral speed that the welding speed is 15 cm/min and the controlling outer electro-magnetic field was applied by arranging a pair of coils 3 and 3' wound around iron cores in 400 turns respectively behind a strip electrode 2, that is at the opposite side to a molten pool 4 at both sides of the strip electrode 2 and flowing a current of 1–10 A to each coil as shown in FIG. 2.

In FIG. 1, a numeral 5 is rolls for feeding the electrode, a numeral 6 is a flux, a numeral 7 is a slag, a numeral 8 is a surfaced metal, and in FIG. 2, a numeral $\beta$ shows the direction of the controlled flow in a molten pool 4 of the molten slag 4A and the molten metal 4B.

As the result, in the former flux, the molten slag reacts too sensitively to enable the control and the overlapped portion of the bead is not uniform and under cuttings are formed.

In the case of using the latter flux, when the position of the strip electrode 2 shown in FIG. 1 is more than 15 mm in a distant size l from a downward vertical radius line $\gamma$ of the cylinder 1, an arc is formed, while when said position is less than 5 mm, the defects of slag inclusion and lack of fusion are caused and the range of the moderate condition is narrow and when the working precision of the cylinder is taken into consideration, there is problem in practice and even if the distance l of the electrode position is kept in the range of 5–15 mm, the flow control with the outer electro-magnetic field becomes very insensitive because of high viscosity of the molten slag and the variation of the slag flow due to the unstability of the ground position and the voltage supply cannot be satisfactorily controlled.

The inventors have prepared a variety of fluxes within a flux composition range having a high content of $CaF_2$ and having stable current flowing and low formation of arc and made studies with respect to these fluxes and found that when a moderate amount of $SiO_2$ is added within the range of 50–60% by weight, the flow of the molten slag and metal can be advantageously and properly controlled with the outer electro-magnetic field.

That is, as shown in FIG. 3, it has been found that if a ratio of $SiO_2/CaF_2$ is at least 0.20 within the range of 50–60% by weight of $CaF_2$, the flow of the molten slag and metal can be satisfactorily controlled with the outer electro-magnetic field.

In this experiment, the other components of the flux were 0–25% by weight of CaO and 10–35% by weight of $Al_2O_3$.

When $SiO_2$ exceeds 20%, the viscosity is excessively high and the flow control becomes difficult. When $CaF_2$ exceeds 60%, even if the ratio of $SiO_2/CaF_2$ is at least 0.20%, the viscosity excessively lowers and the flow control becomes difficult.

$SiO_2$ reacts with $CaF_2$ to generate $SiF_4$ gas as follows when $CaF_2$ is more than 50%.

$$SiO_2 + CaF_2 \rightarrow SiF_4 + CaO$$

The resulting $SiF_4$ has stimulant smell and is harmful in view of industrial hygiene but the addition of CaO lowers the activity of $SiO_2$ to decrease the generation of $SiF_4$.

Studies have been made with respect to this point and it has been found that as shown in FIG. 4, when the ratio of $CaO/SiO_2$ is at least 0.50, there is no stimulant smell and the formation of $SiF_4$ is prevented. But, when CaO exceeds 25%, the separation of the slag becomes difficult, so that CaO should be not more than 25%.

$Al_2O_3$ is effective in an amount of not less than 10% by weight in order to obtain the desirable wave form of the bead surface but when the amount exceeds 30% by weight, the bead surface becomes locally concave and the bead appearance is damaged, so that the amount must be within the range of 10–30% by weight.

When the yield of Mn and Cr in the surfaced metal must be increased, oxides of Mn and Cr may be added as the flux component and an amount of each of these metals added is 10% by weight and when the total amount exceeds 15% by weight, the separability of the slag is deteriorated and defects are caused at the toe portion of the bead and further the flow control with the outer electro-magnetic field becomes difficult, so that even when such oxides are added, the added amount of each component should be less than 10% by weight and the total amount should be less than 15% by weight.

A typical embodiment of the flux composition used in the above described test and the obtained results are shown in the following Table 1.

TABLE 1

| | Chemical components (wt %) | | | | | Welding test results | | | | |
|---|---|---|---|---|---|---|---|---|---|---|
| | $CaF_2$ | $SiO_2$ | CaO | $Al_2O_3$ | Other | Arc formation | Control of slag | Stimulant smell | Separability of slag | Bead appearance |
| F-1 | 45 | 10 | 15 | 30 | 0 | x | x | o | o | x |
| 2 | " | 15 | 15 | 20 | $Cr_2O_3$ 5 | x | x | o | o | x |
| 3 | " | 20 | 10 | 25 | 0 | x | x | o | o | x |
| 4 | 48 | 7 | 25 | 20 | 0 | o | x | o | o | x |
| 5 | " | 12 | 15 | 25 | 0 | o | Δ | o | o | x |
| 6 | " | 18 | 15 | 19 | 0 | x | o | o | o | o |
| 7 | 50 | 10 | 10 | 30 | 0 | o | o | o | o | o |
| 8 | " | 15 | 10 | 25 | 0 | o | o | o | o | o |

TABLE 1-continued

| | | | | | | | | | | |
|---|---|---|---|---|---|---|---|---|---|---|
| 9 | " | 20 | 0 | 30 | 0 | o | o | x | o | o |
| 10 | " | 25 | 15 | 10 | 0 | x | o | o | o | o |
| 11 | 52 | 7 | 0 | 33 | MnO 5 ZrO₂ 3 | o | x | x | o | x |
| 12 | " | 7 | 25 | 16 | 0 | o | x | o | o | x |
| 13 | " | 12 | 15 | 21 | 0 | o | o | o | o | o |
| 14 | " | 18 | 15 | 15 | 0 | o | o | o | o | o |
| 15 | 55 | 10 | 10 | 25 | 0 | o | x | o | o | x |
| 16 | " | 15 | 0 | 30 | 0 | o | o | x | o | o |
| 17 | " | 20 | 10 | 15 | 0 | o | o | o | o | o |
| 18 | " | 25 | 5 | 15 | 0 | o | x | x | o | x |
| 19 | 58 | 7 | 0 | 35 | 0 | o | x | x | o | x |
| 20 | " | 7 | 5 | 30 | 0 | o | x | o | o | x |
| 21 | " | 12 | 15 | 15 | 0 | o | o | o | o | o |
| 22 | " | 18 | 5 | 19 | 0 | o | o | x | o | o |
| 23 | 60 | 10 | 0 | 30 | 0 | o | x | x | o | x |
| 24 | " | 15 | 10 | 15 | 0 | o | o | o | o | o |
| 25 | " | 20 | 0 | 20 | 0 | o | o | x | o | o |
| 26 | " | 25 | 5 | 10 | 0 | o | x | x | o | x |
| 27 | 63 | 7 | 0 | 30 | 0 | o | x | x | o | x |
| 28 | " | 7 | 5 | 25 | 0 | o | x | o | o | x |
| 29 | " | 12 | 5 | 20 | 0 | o | x | x | o | x |
| 30 | " | 18 | 5 | 14 | 0 | o | x | x | o | x |
| 31 | 50 | 12 | 6 | 32 | 0 | o | o | o | o | x |
| 32 | 58 | 20 | 14 | 8 | 0 | o | o | o | o | x |
| 33 | 52 | 12 | 10 | 16 | Cr₂O₃ 10 | o | o | o | o | o |
| 34 | " | 12 | 10 | 13 | Cr₂O₃ 13 | o | Δ | o | x | Δ |
| 35 | " | 12 | 10 | 16 | MnO 10 | o | o | o | o | o |
| 36 | " | 12 | 10 | 13 | MnO 13 | o | Δ | o | x | Δ |
| 37 | " | 12 | 8 | 11 | Cr₂O₃ 10 MnO 7 | o | Δ | o | x | Δ |

Welding condition SUS 309L 0.4 × 150 mm, 2,500A-28V-15 cm/min
Inner diameter of cylinder: 2 m Electrode position: l = 30 mm Arc Formation
x Arc is formed
o Arc is not formed
Control of Slag
x Impossible
Δ Unsatisfactory
o Possible
Stimulant smell
x Generate
o Not generate
Separability of slag
x Bad
o Good
Bead appearance
x Bad
Δ Irregular bead edge
o Good In the present invention, by using the flux composition containing 50–60% by weight of $CaF_2$, 10–20% by weight of $SiO_2$, 5–25% by weight of CaO, 10–30% by weight of $Al_2O_3$ in a ratio of $SiO_2/CaF_2$ of at least 0.20 and a ratio of $CaO/SiO_2$ of at least 0.50, the electro-slag over-lay welding process can be safely and advantageously applied to the circumferential surface of a cylinder while controlling the flow of the molten slag and metal with an outer electro-magnetic field.

The flux composition of the present invention is adaptable to a cylinder having an inner diameter of 700–6,000 mm under a welding speed of 8–30 cm/min.

The following examples are given for the purpose of illustration of this invention and are not intended as limitations thereof.

EXAMPLE 1

An inner surface of a cylinder having a sheet thickness of 80 mm and an inner diameter of 2 m and composed of ASTM A 533 GrB Cl 1 steel was subjected to over-lay welding along the circumferential direction by using an austenitic stainless steel strip SUS 309L or SUS 347 (both steel sheets: 0.4 × 150 mm) following to FIG. 1.

The flux compositions to be tested are fused fluxes prepared by fusing the components of each of F101–103 in Table 2 and pulverizing the fused product into 20–200 meshes.

TABLE 2

| | | Flux | | | | | | | | Welding test results | | | | |
|---|---|---|---|---|---|---|---|---|---|---|---|---|---|---|
| | | CaF₂ (%) | SiO₂ (%) | SiO₂/CaF₂ | CaO (%) | CaO/SiO₂ | Al₂O₃ (%) | Cr₂O₃ (%) | MnO (%) | Arc formation | Control of slag | Stimulant smell | Bead appearance | Total judgement |
| Present invention | F101 | 58 | 12 | 0.21 | 15 | 1.25 | 15 | 0 | 0 | o | o | o | o | Acceptable |
| | 102 | 55 | 18 | 0.33 | 10 | 0.56 | 12 | 5 | 0 | o | o | o | o | Acceptable |
| | 103 | 52 | 12 | 0.23 | 15 | 1.25 | 13 | 5 | 3 | o | o | o | o | Acceptable |
| Com- | 2 | 45 | 15 | 0.38 | 15 | 1.00 | 20 | 5 | 0 | x | x | o | Under | Non- |

TABLE 2-continued

| | | CaF₂ (%) | SiO₂ (%) | SiO₂/CaF₂ | CaO (%) | CaO/SiO₂ | Al₂O₃ (%) | Cr₂O₃ (%) | MnO (%) | Arc formation | Control of slag | Stimulant smell | Bead appearance | Total judgement |
|---|---|---|---|---|---|---|---|---|---|---|---|---|---|---|
| Comparative Example | 11 | 52 | 7 | 0.13 | 0 | — | 33 | ZrO₂ 3 | 5 | o | x | x | Under cutting | Non-acceptable |
| | 16 | 58 | 18 | 0.31 | 5 | 0.28 | 19 | 0 | 0 | o | o | x | cutting o | acceptable Non-acceptable |
| | 29 | 63 | 12 | 0.19 | 5 | 0.41 | 20 | 0 | 0 | o | x | x | Under cutting | Non-acceptable |

The estimation marks of "arc formation", "control of slag", "stimulant smell" and "bead appearance" have the same meanings as in Table 1.

The welding conditions were as follows. The welding current was 2,500 A, the welding voltage was 28 v, the welding speed was 15 cm/min and as the outer electro-magnetic field, 400 turn of coils wound around an iron core were arranged as shown in FIG. 2 and the control was effected by flowing a current of 1–10 A.

The position of the strip electrode was 30 mm in the distance l shown in FIG. 1.

The chemical components of each strip electrode and the surface metal obtained thereby are shown in Tables 3 and 4 and in any case, the control of the flow of the molten slag and metal with the outer electro-magnetic field was easy and good surfaced beads having no defect, such as under cutting were obtained.

TABLE 3

| | Flux | Chemical components (wt %) | | | | | | |
|---|---|---|---|---|---|---|---|---|
| | | C | Si | Mn | P | S | Ni | Cr |
| Strip electrode | — | 0.02 | 0.31 | 2.20 | 0.018 | 0.005 | 10.63 | 20.86 |
| Surfaced metal | F101 | 0.04 | 0.55 | 1.68 | 0.020 | 0.005 | 9.78 | 18.53 |
| | F102 | 0.04 | 0.61 | 1.70 | 0.021 | 0.005 | 9.83 | 18.89 |
| | F103 | 0.04 | 0.54 | 2.14 | 0.021 | 0.005 | 9.63 | 19.04 |

Electrode: SUS 309L 0.4 × 150 mm

TABLE 4

| | Chemical components (wt %) | | | | | | | |
|---|---|---|---|---|---|---|---|---|
| | C | Si | Mn | P | S | Ni | Cr | Nb |
| Electrode | 0.03 | 0.35 | 1.89 | 0.021 | 0.003 | 11.21 | 19.86 | 0.87 |
| Surfaced metal | 0.05 | 0.59 | 1.35 | 0.022 | 0.004 | 10.42 | 19.24 | 0.61 |

Flux F102
Electrode SUS 347

However, Comparative fluxes shown in Table 2 were judged as "non-acceptable" because of the problems as shown in the welding test results.

EXAMPLE 2

By using a sintered flux prepared by granulating and drying the flux composition shown in F102 in Table 2 and screening the granules into 12–200 meshes and a ferritic stainless steel strip SUS 410 (0.4×150 mm), the over-lay welding test was conducted in the same manner as described in Example 1.

The chemical components of the electrode and the surfaced metal are shown in Table 5. The control of the flow of the molten slag and metal was easy and a good surfaced bead having no defect, such as under cutting was obtained.

TABLE 5

| | Chemical component (wt %) | | | | | |
|---|---|---|---|---|---|---|
| | C | Si | Mn | P | S | Cr |
| Electrode | 0.04 | 0.20 | 0.58 | 0.020 | 0.010 | 13.96 |
| Surfaced metal | 0.06 | 0.45 | 0.41 | 0.022 | 0.009 | 13.04 |

Flux F102 Sintered type
Electrode SUS 410

As mentioned above, according to the present invention, when the electro-slag over-lay welding process is applied on a circumferential surface of a cylindrical vessel while controlling the flow of the molten slag and metal with the outer electro-magnetic field, the flow control can be satisfactorily carried out and the over-lay welding having no defect can be advantageously effected in spite of variation of the position for arranging the strip electrode resulting from the error in production of the cylindrical vessel.

What is claimed is:

1. A flux composition for horizontal electro-slag over-lay welding a stainless steel on a circumferential inner surface of a cylindrical vessel with a strip electrode under controlling a flow of molten slag and metal with an outer electro-magnetic field, which contains 50–60% by weight of $CaF_2$, 10–20% by weight of $SiO_2$, 5–25% by weight of CaO and 10–30% by weight of $Al_2O_3$ in a ratio of $SiO_2/CaF_2$ of at least 0.20 and a ratio of $CaO/SiO_2$ of at least 0.50.

2. The flux composition as claimed in claim 1, wherein at least one of manganese oxide and chromium oxide is added in an amount of each component being less than 10% by weight and in a total amount of both components being less than 15% by weight.

* * * * *